Sept. 5, 1961 H. STOBBE ET AL 2,999,130

CIRCUIT ARRANGEMENT FOR LINE IDENTIFICATION

Filed June 5, 1957 2 Sheets-Sheet 1

INVENTORS
H. STOBBE
H. HEITMANN

BY [signature]

ATTORNEY

Sept. 5, 1961 H. STOBBE ET AL 2,999,130

CIRCUIT ARRANGEMENT FOR LINE IDENTIFICATION

Filed June 5, 1957 2 Sheets-Sheet 2

INVENTOR
H. STOBBE -
H. HEITMANN

BY

Albert Dewis

ATTORNEY 2,999,130

CIRCUIT ARRANGEMENT FOR LINE IDENTIFICATION

Helmut Stobbe, Ludwigsburg, and Herbert Heitmann, Stuttgart-Feuerbach, Germany, assignors to International Standard Electric Corporation, New York, N.Y., a corporation of Delaware Filed June 5, 1957, Ser. No. 663,680
Claims priority, application Germany June 15, 1956
7 Claims. (Cl. 179—18)

Figure 1:
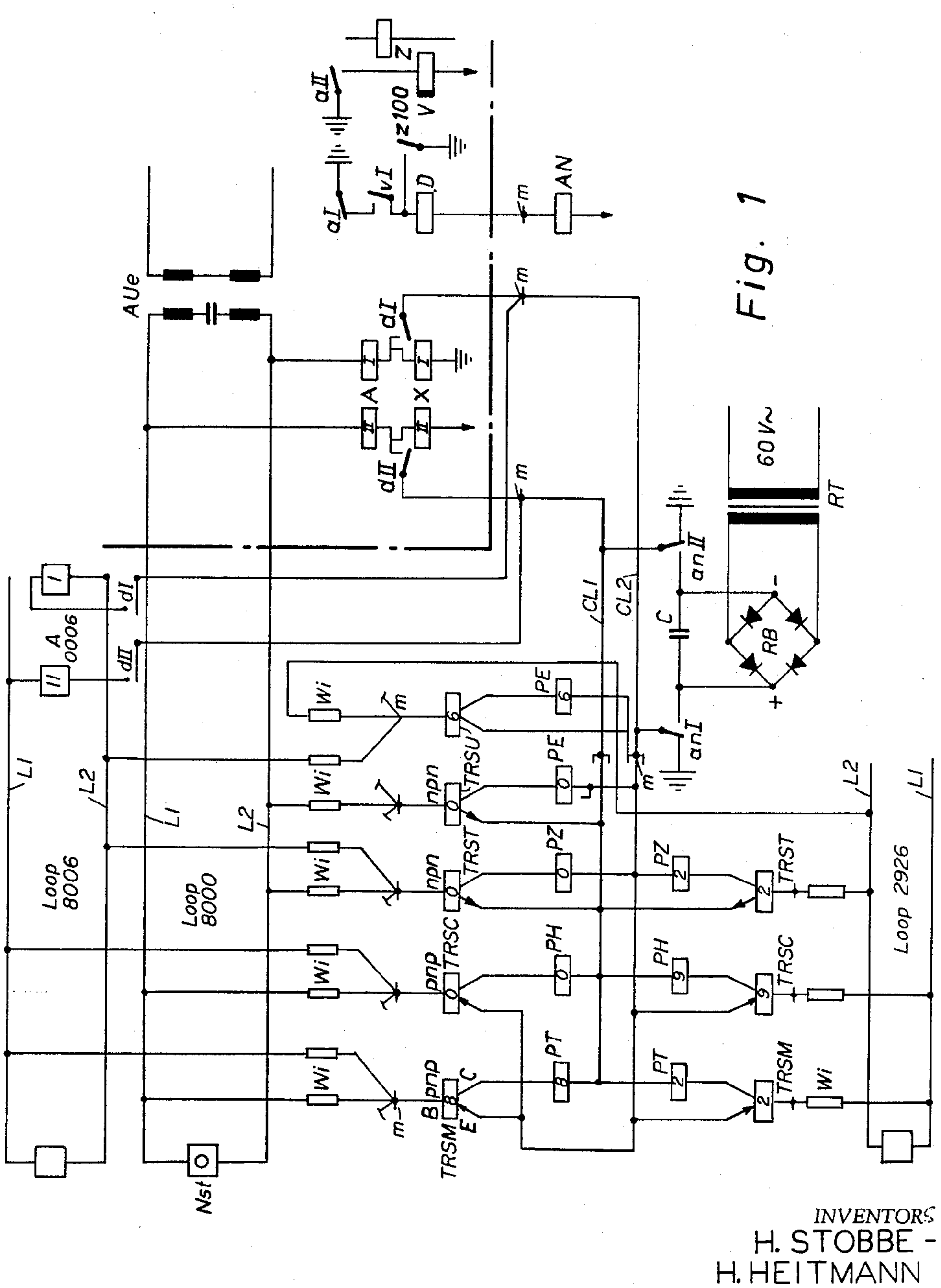

This invention relates to line identification and more particularly to the identification of a particular line in the telecommunication art.

In telephony, it is necessary to determine from which subscriber's line a call has been made in order to meter and properly assess a charge against the calling subscriber. Each telephone subscriber, for instance, has a meter located at the exchange upon which such charges are recorded. At the exchange after identification of the calling line has been made, the individual meter is caused to be advanced by electrical impulses applied thereto, the number of the impulses bearing a relation to the distance between the calling subscriber and the called subscriber (generally called zones) and the duration of the connection. Cyclical recurring pulses called clock pulses time the length of the call, as is well known to those skilled in the art. In conventional arrangements, identification of a line is accomplished by setting up a control circuit which is closed over the line finder switch which hunts for the calling line and thereby the calling line is identified when the line finder reaches the contact associated therewith. Where there are a large number of lines in an exchange in order to prevent the unnecessary starting of a great number of line finder switches, the lines have been divided into groups and upon request for an identification there is first selected the group of which the line to be identified is one. By this means only that finder is started, which is associated with this particular group. If such an identification is carried out at the conclusion of the conversation between the the calling subscriber and the called party, then it is necessary in this type of system to maintain the established connection until identification has been completed. This entails the withdrawal from service of connecting devices for an unnecessary long time, namely the duration of the call. To overcome this disadvantage, identification is commenced during the conversation so that at the conclusion of the conversation the connecting devices are immediately available to other subscriber's lines. However, in the last-mentioned arrangements special switching means are required to prevent the conversation from being interfered with by the identification process and yet the identification information must be readily recorded at the end of the call. Thus in one known arrangement, identification is effected by combining the subscriber's lines via an additional counting or metering wire. In large installations, however, no additional metering wire is available and care must be taken that the many signalling voltages which may be applied to the lines will not be permitted to cause an advance of the meter upon closure of the control circuit.

The instant invention affords an improved circuit arrangement for manifesting identity of any of a large number of lines such as subscriber lines or the like, without the need of hunting, especially such circuit arrangement for the identification of lines divided into groups and wherein the identification is completed upon the termination of the call. By utilizing the invention, switching means is dispensed with which would be necessary when identification is carried out during the pendency of the call and which avoids any interference with the signalling process necessary to effect the call. The invention avoids all the disadvantages of the prior arrangements, wherein identification is carried out at the termination of the call by dealing with the lines in decade notation groups and combining the same by means of high-resistance couplings with a control line which is common to all the lines and forms part of the control circuit. Upon closure of the control circuit at the termination of the call switch means will become simultaneously effective for each decade and enable marking of the calling subscriber's line. The arrangement is such that closure of the control circuit disconnects the exchange battery and applies an independent voltage source to the control circuit. The exchange battery which is normally connected to the subscriber's loop is disconnected and the independent source is connected to windings of the line relay.

According to the invention, denominational orders of identity manifesting means are provided for a plurality of the lines, the lines being conventionally numbered in the decade notation. Each line will be associated with a combination of identity manifesting elements, one in each denominational order, so that operation of the combination of these elements will manifest the line number. Each line will be coupled through high impedance resistors and electronic switch means with its appropriate combination of identifying elements. When identification of a line is called for, means individual to the line will apply the effect of the common operating or control circuit, through the line and the resistors and switch means coupled thereto, upon the combination of elements for manifesting identity of the line. A group of the lines will have the same digit in an order of their line numbers and therefore will be associated with the one element in the corresponding order of elements for manifesting the digit. One function of the high impedance resistors individually interposed between the lines of the group and the circuit of said identifying element common to the group is to segregate the effect of the operating circuit applied upon one line of the group from other lines of the group and prevent back circuits and crosstalk between the lines of the group. Another function of the high impedance resistors is to prevent signaling currents on the lines from effecting the identifying circuits and the electronic switch means therein.

A feature of the invention is the use of solid state devices such as transistors as the electronic switch means through which a line transmits the effect of the common operating circuit to the line identifying means, the transistors also serving to isolate the exchange battery from the metering control circuit during the pendency of the call.

Figure 2:
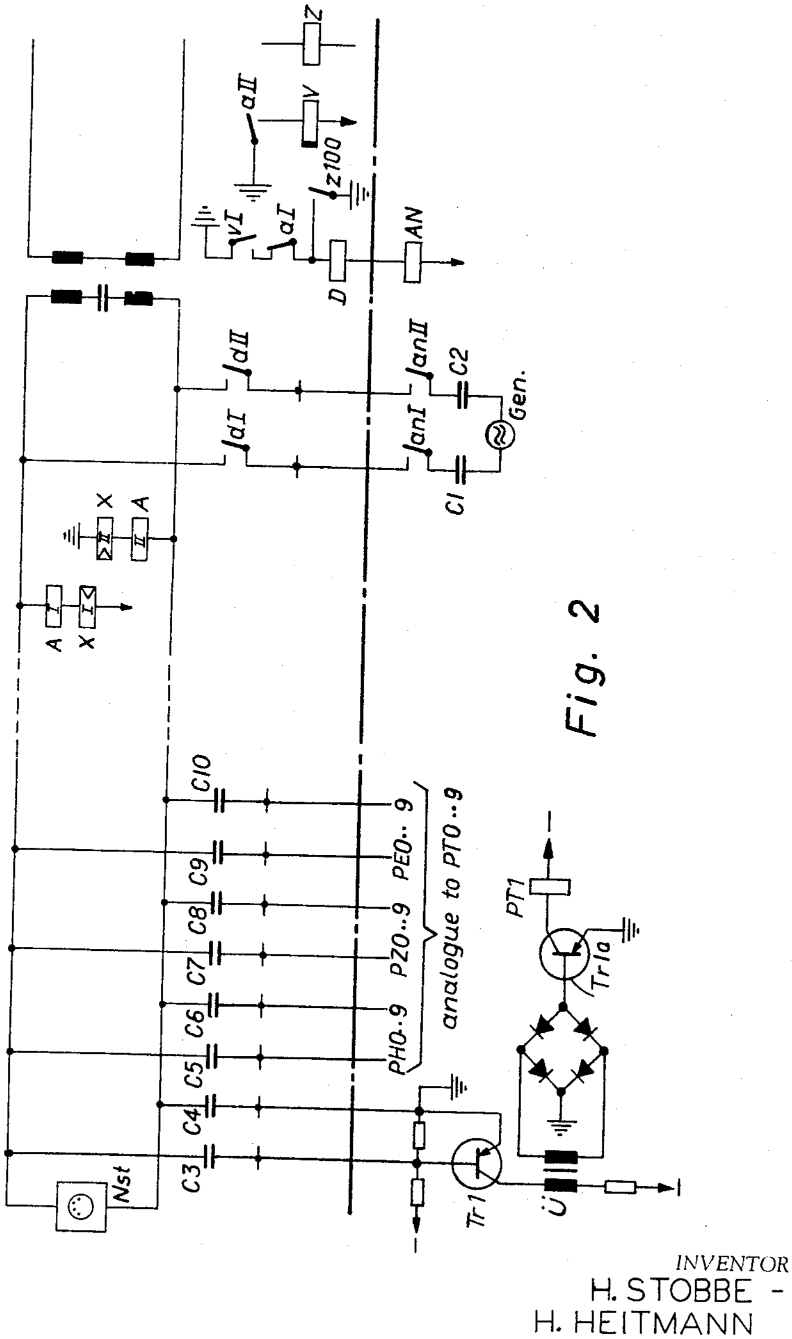

The above-mentioned and other features and objects of this invention and the manner of attaining them will become more apparent and the invention itself will be best understood, by reference to the following description of an embodiment of the invention taken in conjunction with the accompanying drawings, wherein:

FIG. 1 is a schematic representation of a portion of a telephone system including a subscriber's loop and the novel identification circuits; and FIG. 2 is a schematic representation of a modification of the circuit shown in FIG. 1 utilizing a high-frequency signalling source to power the identification circuit.

Referring now to FIG. 1, there is shown schematically a portion of a telecommunication system wherein lines or subscriber loops are identified by four-place numbers in the decade notation. For purposes of the disclosure, it is sufficient to indicate three subscriber loops and associated identifying circuits. Each subscriber loop includes a subscriber's sub-set, N*st* coupled to conductors L1, L2 leading to an outgoing repeater AU*e*. The usual line relay A having windings I and II is serially connected between the loop and the source of exchange battery represented by the ground and the arrow. As is well known by those skilled in the art, the seizure of the loop by the subscriber results in the operation of the line relay A. The relay A is provided with a back contact *a*I and a front contact *a*II. The last-mentioned contact is adapted to complete a circuit for the slow-release supervisory relay V over an obvious path. There is further provided a disconnect relay D and a potential-applying relay AN. The windings of these latter relays are connected in series between the exchange battery, back contact *a*I and the front contact *v*I, which latter contact is associated with the V relay. The disconnect relay D has associated therewith a pair of make-before-break contacts *d*I, *d*II and which contacts are adapted to normally apply the exchange battery to the subscriber's loop over the windings I and II of relay X and the windings of the relay A when the relay D is in the deenergized condition. It should be clear that a set of relays A, X, V and D is individual to each subscriber loop. On the other hand, relay AN is common to a plurality of subscriber loops and has multiple connections at a junction *m* to the relays D for the plurality of loops. It may be mentioned that a similar junction *m* is provided at each point where multiple connections are made from a single lead to a gang of individual leads.

There is further provided a common control circuit consisting of conductors CL1, CL2 coupled to the movable contacts *d*I, *d*II. There is further provided four decade orders of ten relays each, capable of manifesting identities of ten thousand subscriber loops. The relays of the thousands, hundreds, tens and units orders, respectively, are designated PT, PH, PZ and PE, and each relay may be distinguished further by the digit 0, 1, . . . or 9 to which it pertains. Two orders of the relays, the thousands and hundreds orders PT and PH in the FIG. 1 embodiment, are connected at one side to the common conductor circuit lead CL1 and the relays of the other two orders connect at one side to the common control circuit conductor CL2. The other sides of said relays are individually connected to the collector electrodes of transistors TRSM, TRSC, TRST, and TRSU, one transistor to one relay. The emitter electrodes of said transistors are coupled respectively to the lead of CL1, CL2 which is opposite to the lead connected to the collector electrodes through to the associated relays PT0 . . . 9, PH0 . . . 9, PZ0 . . . 9 and PE0 . . . 9, respectively. The base electrodes of the aforementioned transistors are connected either to the conductors L1 or L2 of subscriber lines via separate high impedance resistors W*i*. The transistors TRSM and TRSC, as shown, are of the pnp-type and have their bases impedance-coupled to conductors L1, their emitters connected to CL2 and their collectors coupled via relays PT and PH to CL1, and the transistors TRST and TRSU are of the npn-type and have their bases impedance-coupled to L2, their emitters connected to CL1 and their collectors coupled via relays PZ and PE to CL2. Analogously, the arrangement can also be made in a different way, as long as the desired function of the arrangement, described in particular hereinafter, will be maintained thereby. The base electrode of each transistor TRSM has a lead to a junction *m* from which multiple connections are made via the resistors W*i* to conductors L1 of the subscriber lines whose identifying numbers all have in the thousands order the digit to be manifested by the relay PT in the collector circuit of this transistor. Also, each relay PH is associated through a transistor TRSC and resistors W*i* with the conductors L1 of the lines having in the hundreds order of their numbers the digit corresponding to the relay. Similarly, each relay PZ is coupled by an individual transistor TRST and thence via resistors W*i* with conductors L2 of the lines having in the tens order of their numbers the digit corresponding to the PZ relay. Finally, each relay PE is coupled by a transistor TRSU and multiple resistors W*i* to the conductors L2 of the lines having in the units order of their numbers the digit corresponding to the PE relay. For instance, the base electrode of TRSM8, which is the switch means for relay PT8, is coupled via individual resistors W*i* to conductors L1 of the loops 8000 and 8006 and of the other loops whose numbers have digit 8 in the thousands order. As another example, the base electrode of TRSU6, in control of PE6, is coupled by individual resistors W*i* to conductors L2 of loops 8006 and 2926 and of other loops having the digit 6 in the units order of their numbers. The arrangement provides, as will be clear now, for each loop to be coupled via impedance means and electronic switches to a combination of four identity manifesting relays, one in each denominational order, for manifesting the digits in the four-place loop number. Thus loop 8000 is coupled to relays PT8, PH0, PZ0 and PE0; loop 8006 is coupled to relays PT8, PH0, PZ0 and PE6; and loop 2926 is coupled to relays PT2, PH9, PZ2 and PE6. The resistance of the resistors W*i* is such that they present a high impedance to the passage of signalling currents and/or voice currents or telegraph currents which may normally appear on the subscriber's loop. The transistors are normally blocked from conducting since there is a short-circuit across their emitter and collector terminals by virtue of the transfer contacts *an*I, *an*II which normally shunt the common control conductors CL1, CL2. There is further provided a rectified alternating current supply whereby alternating current from the mains is transformed by means of transformer U and is applied to the full wave rectifier network RB and to the front contacts *an*I, *an*II respectively. The output of the rectifier network is filtered by means of condenser C connected thereacross.

The operation of the device will now be described. Seizure of the subscriber's loop 8000 results in the operation of the loop relay A. Contact *a*II causes the relay V to operate. Exchange battery is applied to the subscriber's loop over the windings I and II of the relays A, X. The termination of the call by the subscriber characterized by the opening of the metallic circuit in the subscriber's sub-set causes the relay A to drop. The circuit is thereby completed from the operation of the disconnect relay D and the potential-applying relay AN over the back contact *a*I and front contact *v*I of relay V and the series connection of relay D and AN. It will be remembered that supervisory relay V is a slow-release relay and contact *v*I remains closed although contact *a*II has opened. The operation of the disconnect relay D causes its contacts *d*I and *d*II to open the circuit between the subscriber's loop and the exchange battery and couples the common control circuit leads CL1, CL2 to the subscriber's loop via the windings of the relay A. The operation of the AN relay causes the disconnection of the shunt to ground of both of the leads CL1 and CL2 by means of the contacts *an*I, *an*II and applies the rectified alternating current derived from the network RB to the common control circuit. Thus negative potential will be applied from the rectifier network RB over front contact *an*II, closed contact *d*II, winding *a*II to the line L1 of loop 8000. Similarly, positive potential will be applied from the rectifier network RB via front transfer contact *an*I to the common control circuit lead CL2, closed contact *d*I to line L2 of the subscriber's loop 8000. By virtue of the connection of the transistors, negative potential now applied via L1 of loop 8000 and connected resistors W*i* to the base electrodes B of transistors TRSM8 and TRSC0 and positive potential now applied via L2 of this loop and connected resistors W*i* to the base electrodes B of the transistors TRST0 and TRSU0 bias these transistors to pass current from CL1 and CL2 through these transistors and their load relays PT8, PH0, PZ0 and PE0. Thus, these relays will operate to mark the identity of loop 8000. In a similar manner, potential applied to L1 and L2 of loop 8006 via the relay points dII and dI associated with this loop will condition the transistors TRSM8, TRSC0, TRST0 and TRSU6 to cause relays PT8, PH0, PZ0 and PE6 to operate for marking the identity of this loop. Similarly, assuming that the subscriber's directory number is 2926 and that the metallic circuit of the sub-set has been broken, potential will be applied via L1 and L2 of loop 2926 and via individual resistors Wi to transistors TRSM2, TRSC9, TRST2 and TRSU6, whereby relays PT2, PH9, PZ2 and PE6 will operate and will mark the number of the calling subscriber. By contacts not shown, this marking will be evaluated and transferred to registering equipment in a known manner. This procedure is practically instantaneous and takes place within the delay time of the relay V. Thus it will be seen that the exchange battery potential has been disconnected and identification achieved through the use of the separate identification potential, all without the use of special switching apparatus required by the prior art. In its broad aspect, the invention is not limited to marking the identity of a loop only upon completion of a call. Thus, identification may be initiated during the call interval by closing contacts z100 to establish an alternative circuit for the common relay AN and the individual line relay D. Contacts z100 may be closed by any suitable means. In the simplest case, it may be assumed that these contacts are closed manually at a desired time during the period of a call on a line. In practice, however, a meter is provided for each subscriber line, as is well known, to function in response to clock pulses, for metering the call on the line. The relay Z represents an element of such meter energized to close its contacts z100 upon the receipt of the hundredth metering pulse which may be applied thereto during a call on the line, whereby the line relay D, along with the common relay AN, will operate to cause the identifying circuits to function for marking the line identity.

FIG. 2 is a modification of the circuit shown in FIG. 1 and utilizes a high-frequency alternating current source to operate the line identifying relays PT0 . . . 9, PE0 . . . 9. In this embodiment the generator Gen. is adapted to be coupled to the subscriber's loop by means of coupling condensers C1, C2, the contacts anI, anII and dI, dII. The transistors circuits are coupled to the lines L1, L2 by means of further capacitors C3 . . . C10, as shown. The impedance of the condensers C3 . . . C10 is high with respect to signalling currents, etc. and is low with respect to high-frequency currents received from the source Gen. The transistors may be gated by low level currents which would exclude noise pulses which may appear in the line.

For amplification, each transistor, as indicated for Tr1, applies it output via a transformer U to a rectifier. The rectified voltage will then, as a control voltage, act upon the switching transistor TRLA, to the collector of which there is applied the relay PT1 to be controlled. The arrangement for the other PT relays and for the relay groups PH0 . . . 9, PZ0 . . . 9 and PE0 . . . 9 is made in analogously the same manner.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A circuit arrangement for selectively manifesting multi-digit numbers identifying subscriber lines in a telecommunication system, comprising a plurality of orders of different digit manifesting circuits, separate impedance means individually coupling the lines of a group having the same digit in an order of their numbers to the manifesting circuit for this digit in the corresponding order of the manifesting circuits, each line being thus coupled by a plurality of connected impedance means to a combination of the digit manifesting circuits, one in each order, to manifest the multi-digit number of the line, a common operating circuit for the identifying circuits, a source of electric potential for said operating circuit, and switch means controlled by a subscriber line sub-set and including a switch device common to a plurality of the lines for switching potential from said source to said operating circuit and further including a switch device individual to the line for applying potential from the operating circuit via the line and the connected impedance means to the combination of digit manifesting circuits coupled to the line so as to render this combination of digit manifesting circuits concurrently effective to manifest the identifying number of the called line.

2. An arrangement as defined in claim 1, wherein a circuit is provided for applying normal exchange potential to a calling subscriber line, said switch device individual to the line having means for breaking the latter circuit concomitantly with the application of potential from said operating circuit to the line.

3. An arrangement as defined in claim 1, each line having its own line relay operated upon seizure of the line for a call and also having its own slow-release supervisory relay operated under control of the line relay and remaining in effect for a delay interval after dropping of the line relay, a circuit for the aforementioned switch device common to a plurality of the lines and for the aforementioned switch device individual to the line, a first contact in the latter circuit opened upon and during operation of the line relay and a second contact in the latter circuit closed during operation of and under control of said supervisory relay, the latter circuit thereby being established upon dropping of the line relay at the conclusion of a call and during continued closure of said second contact during the delay interval, whereby said switch device common to the plurality of lines and said switch device individual to the line are operated during the delay interval to bring about the identification of the line by the combination of identifying circuits coupled to the line.

4. An arrangement as defined in claim 1, each digit manifesting circuit including a transistor and a digit relay, the collector of the transistor being coupled via the relay to one side of said operating circuit, the emitter of the transistor being connected to the opposite side of the operating circuit, and the base electrode of the transistor being impedance-coupled to a plurality of the subscriber lines, whereby upon the switching of potential from said source to said operating circuit appropriate potentials are impressed on the emitter and collector of the transistor and whereby operation of the switch device individual to a line directs potential from the operating circuit via the line to the base electrode of the transistor to render it effective for passing energizing current through the digit relay in its collector circuit.

5. A circuit as claimed in claim 1, wherein said separate impedance means comprise high ohmic resistance.

6. A circuit as claimed in claim 1, wherein said separate impedance means comprise capacitors having a high impedance at voice frequencies.

7. A circuit as claimed in claim 6, wherein said potential source comprises a high frequency generator having a frequency to which said capacitors exhibit a low impedance.

References Cited in the file of this patent

UNITED STATES PATENTS

| | | |
|---|---|---|
| 2,238,223 | Kozma | Apr. 15, 1941 |
| 2,338,242 | Haigh | Jan. 4, 1944 |
| 2,739,187 | Holden | Mar. 20, 1956 |
| 2,857,470 | Faulkner | Oct. 21, 1958 |